(12) United States Patent
Staender (10) Patent No.: US 12,510,401 B2
(45) Date of Patent: Dec. 30, 2025

(54) GRAVIMETRIC MEASURING DEVICE

(71) Applicant: SARTORIUS LAB INSTRUMENTS GMBH & CO. KG, Goettingen (DE)

(72) Inventor: Malte Staender, Heiligenstadt (DE)

(73) Assignee: SARTORIUS LAB INSTRUMENTS GMBH & CO. KG, Goettingen (DE)

( * ) Notice: Subject to any disclaimer, the term of this patent is extended or adjusted under 35 U.S.C. 154(b) by 522 days.

(21) Appl. No.: 17/971,879

(22) Filed: Oct. 24, 2022

(65) Prior Publication Data

US 2023/0043909 A1    Feb. 9, 2023

Related U.S. Application Data

(63) Continuation of application No. PCT/EP2021/050220, filed on Jan. 8, 2021.

(30) Foreign Application Priority Data

Apr. 22, 2020  (DE) .................. 10 2020 110 865.6

(51) Int. Cl.
*G01G 21/22*    (2006.01)
*G01G 21/28*    (2006.01)

(52) U.S. Cl.
CPC ........... *G01G 21/286* (2013.01); *G01G 21/22* (2013.01)

(58) Field of Classification Search
CPC .............................. G01G 21/286; G01G 21/23
See application file for complete search history.

(56) References Cited

U.S. PATENT DOCUMENTS 6,331,683 B1  12/2001  Spannagel et al.
10,197,435 B2  2/2019  Graf et al.
(Continued)

FOREIGN PATENT DOCUMENTS

CN    103033436 A  *  4/2013  ............ G01N 5/045
CN    203259241 U      10/2013
(Continued)

OTHER PUBLICATIONS

German Office with Action English Translation, Application No. 10 2020 110 865.6, Mar. 2, 2021, 8 pages.
(Continued)

*Primary Examiner* — Peter J Macchiarolo
*Assistant Examiner* — Mireille S Sadate-Moualeu
(74) *Attorney, Agent, or Firm* — Edell, Shapiro & Finnan, LLC (57) ABSTRACT

A gravimetric measuring device (10, 10', 10", 10''') includes a balance base body (12) and a top unit (14, 14', 14", 14'''), wherein the balance base body (12) has a balance base body wall (20), to which the top unit (14, 14', 14", 14''') can be reversibly fixed, and a weighing system with a load receptor (22) passing through the balance base body wall (20) and the top unit (14, 14', 14", 14'''). A plurality of optical, magnetic, tactile, radio, thermal, electrical and/or electronic interfaces (201) coupled to a balance electronics are arranged on the balance base body wall (20), at least one of which interfaces is connected to a corresponding interface of the top unit (14, 14', 14", 14''') to form an optical, magnetic, tactile, radio, thermal, electrical or electronic connection between the top unit (14, 14', 14", 14''') and the balance electronics.

8 Claims, 4 Drawing Sheets

(56) References Cited

U.S. PATENT DOCUMENTS

| | | |
|---|---|---|
| 2008/0314650 A1 | 12/2008 | Duppre |
| 2009/0194340 A1 | 8/2009 | Mock |
| 2019/0316954 A1* | 10/2019 | Buchmann ........... G01G 21/286 |
| 2021/0364341 A1 | 11/2021 | Staender et al. |

FOREIGN PATENT DOCUMENTS

| | | | |
|---|---|---|---|
| CN | 105705918 A | 6/2016 | |
| CN | 109870218 A | 6/2019 | |
| DE | 102005055753 A1 | 5/2007 | |
| DE | 102014101561 A1 | 5/2015 | |
| DE | 102017221139 A1 | 5/2019 | |
| DE | 102019102801 A1 | 8/2020 | |
| EP | 1195584 A1 | 4/2002 | |
| EP | 1367372 B1 * | 11/2005 | ........... G01G 21/286 |
| EP | 2088406 A1 | 8/2009 | |
| EP | 2574900 A1 | 4/2013 | |
| EP | 3074736 B1 | 4/2018 | |
| JP | 2005227212 A * | 8/2005 | |
| WO | 2015074734 A1 | 5/2015 | |

OTHER PUBLICATIONS

International Preliminary Report on Patentability, PCT/EP2021/050220, Jul. 18, 2022, 6 pages.
International Search Report, PCT/EP2021/050220, Apr. 12, 2021, 5 pages.
Chinese Office Action with English translation, Application No. 202180028888.8, Jul. 5, 2024, 20 pages.

* cited by examiner

GRAVIMETRIC MEASURING DEVICE

CROSS REFERENCE TO RELATED APPLICATIONS

This is a Continuation of International Application PCT/EP2021/050220, which has an international filing date of Jan. 8, 2021, and which claims the priority of German Patent Application 10 2020 110 865.6, filed Apr. 22, 2020. The disclosures of both applications are incorporated in their respective entireties into the present Continuation by reference.

FIELD OF INVENTION

The invention relates to a gravimetric measuring device, comprising a balance base body and a top unit, wherein the balance base body has a balance base body wall, to which the top unit can be reversibly fixed, and a weighing system with a load receptor passing through the balance base body wall and the top unit.

BACKGROUND

Such gravimetric measuring devices are known, e.g., from EP 3 074 736 B1.

Precision balances with different modes of operation are generally known. Known, for example, are precision balances with electromagnetic force compensation, strain gauges, vibrating wires, capacitive sensors or piezoresistive sensors. Like other types of balances, they include a sample carrier on which the sample is positioned for weighing. Usually, but not necessarily, the sample carrier is located in a weighing chamber shielded from the environment by a weighing chamber wall, which consists of a weighing chamber base, a weighing chamber lid, weighing chamber side walls, and a front and rear wall. In most cases, the lid, the side walls and/or the front wall are designed as movable draft shield elements or they contain closable access openings to allow positioning of the sample in the weighing chamber. The sample carrier is connected to a load receptor, which usually penetrates the weighing chamber floor. The load receptor is part of a typically complex weighing system, i.e., a typically complex lever mechanism that has a sensor system on the output side in addition to the load receptor on the input side. The specific sensor system is not important in the context of the present invention. The weighing system is located in a weighing system compartment adjacent to the weighing compartment for shielding from environmental influences. Furthermore, such precision balances always include a control device that, in particular, controls the sensor system.

The EP 3 074 736 B1 mentioned at the outset discloses a conventional precision balance with a balance base body and a top unit. The load receptor of the weighing system penetrates the wall of the balance base body in the area that forms the weighing chamber base. The top unit, which is placed on the weighing chamber base, also has a passage opening for the load receptor. In addition, the top unit can be reversibly fixed to the base of the weighing chamber (and thus to the base wall of the balance) so that it can be easily removed for cleaning and then be refitted.

A disadvantage of this balance is that, in contrast to more modern balances, it does not have any additional auxiliary equipment, for example a cooling device, a draft shield control, a lifting device within the weighing chamber, a lighting device or the like. The known balance also does not offer the option for subsequent customization in accordance with later requirements.

Modern balances with additional auxiliary devices such as those mentioned above are known from the state of the art. The disadvantage here, however, is that the balances have to be equipped with such additional auxiliary devices already during their manufacture according to the current needs of a customer. Retrofitting in line with requirements is not possible without substantial additional effort.

EP 1 195 584 A1 describes a balance with auxiliary devices which can be installed as required and which can be reversibly fixed to the rear wall of the weighing chamber with a rail-like holding device. In order to be able to fix auxiliary devices required in the specific individual case in the position required in each case, the rail-like holding device has different mechanical interfaces in the form of recesses into which the auxiliary devices can be inserted as required. Such a system with interchangeable auxiliary devices of different functions is particularly advantageous in laboratory environments in which different weighing tasks must be performed with one and the same balance. The user can then configure the balance himself according to his specific needs in each individual case. Even in cases where the mechanical interfaces are designed in such a way that it is impossible for the user to replace the auxiliary equipment, such systems are also advantageous from the manufacturer's point of view. Based on the same basic balance body, balances can be preassembled for different weighing tasks by selecting the auxiliary devices to be inserted in the receptacles. The number of special parts to be manufactured is drastically reduced, resulting in significant cost savings. However, the holding device protrudes into the weighing chamber, taking up usable space and being susceptible to contamination.

SUMMARY

It is an object of the present invention to provide a gravimetric measuring device of the generic type in which an individualized packing according to requirements is made possible. It is a further object to provide such a gravimetric measuring device that saves space and is less susceptible to contamination, and thus is easier to clean, as compared to conventional devices of this type.

These objects are achieved with the features recited in the independent claims herein. According to one formulation, the present invention proposes a plurality of optical, magnetic, tactile, radio-technical, thermal, electrical and/or electronic interfaces coupled to balance electronics that are arranged on the balance base body wall. At least one of these interfaces is connected to a corresponding interface of the top unit for forming an optical, magnetic, tactile, radio-technical, thermal, electrical or electronic connection between the top unit and the balance electronics.

Preferred embodiments are also described herein and are defined in various of this application's dependent claims.

According to one aspect of the invention, the balance base body wall of a balance is provided with a plurality of interfaces which are coupled to the balance electronics Various interchangeable top units are provided (by the manufacturer and/or user) with active auxiliary devices, i.e., with so-called active top units, which each have one or more corresponding interfaces required for their respective function. This means that the balance can be (re-)configured as required by simply replacing the top unit.

The balance electronics to which the interfaces are coupled include a control device for controlling system operation, which may include, for example, a memory unit, an identification unit, and/or a cooling unit. The interfaces on the balance base body wall can be arranged there in any conceivable area. It is particularly convenient if they are arranged in the area forming the weighing chamber floor or the weighing chamber rear wall. It is possible, but not necessary, for all interfaces to be arranged in the same area of the balance base body wall. The interfaces on the balance base body wall can be optical, magnetic, tactile, radio, thermal, electrical and/or electronic, i.e., they can form an optical, magnetic, tactile, radio, thermal, electrical and/or electronic connection in cooperation with a corresponding interface. The corresponding interfaces are arranged on the top unit so that it is connected to the balance electronics when mounted on the balance base body wall. The contacting of the interfaces on the balance base body wall with the corresponding interfaces on the top unit preferably takes place automatically when the top unit is fastened to the balance base body. It is not necessary that all interfaces on the balance base body wall are contacted by corresponding interfaces on the top unit to form a connection. Rather, it is sufficient if the top unit has at least one interface corresponding to one of the interfaces of the balance base body wall, which is contacted during installation of the top unit, forming a connection.

Since the top unit is reversibly fixable to the balance base body wall, it is easily, i.e. without great effort, exchangeable for other top units which are designed such that they are also reversibly fixable (i.e., detachably fixable, interchangeably fixable, etc.) to the balance base body wall. By providing a plurality of interfaces on the balance base body wall, different active top units with different functions and different corresponding interfaces can be fixed to the balance base body wall. In this way, different top units with different functions can be used to assemble different balances for different applications. The gravimetric measuring device can thus be quickly and easily equipped or retrofitted with other functions by changing the top unit. Purely by way of example, a motorized internal draft shield, a density determination set with integrated temperature sensor, a pipette calibration set with integrated temperature sensor, air pressure sensor and humidity sensor as well as an evaporation trap with a motor-driven shutter, an RFID reader, a load changer for mass comparator applications, an E-field sensor, a magnetic field sensor, a motorized lifting device or a dosing device are among the feasible options. That is, when there is a need to equip or retrofit a balance according to the invention with new functions, the balance base body can be retained, while only the top unit needs to be replaced, since the balance base body is designed so that it forms a functioning gravimetric measuring device in combination with any of various top units having respectively different functions. The design of the balance base body with several interfaces on the balance base body wall also makes it possible to provide new, future functions in the form of new top units that are compatible with the balance base body. This results in a gravimetric measuring device with special flexibility with regard to the assembly of the balance. At the same time, the design of the balance base body with several interfaces on the balance base body wall reduces the number of special parts that must be manufactured on the top units, which leads to significant cost savings in production and has proven to be particularly sustainable.

Preferably, at least one interface on the balance base body wall is designed as a plug or as a socket, and the corresponding interface of the top unit is designed accordingly as a socket or as a plug. The top unit and the balance base body wall can thus be connected to one another via a plug connection, in which the plug arranged on the balance base body wall or on the top unit can be plugged into the socket arranged correspondingly on the top unit or on the balance base body wall, forming a connection. The plug-in connection is an easy-to-implement and easy-to-use option for connecting the top unit to the balance base body and to the balance electronics.

In addition, or alternatively, at least one interface on the balance base body wall can be designed as a contact plate in the same way as the corresponding interface of the top unit, the surfaces of which lie against each other when a connection is formed. This design of an interface is also easy to implement in terms of construction and offers a simple way of connecting the top unit to the balance base body and to the balance electronics in an uncomplicated manner and without great effort. When a top unit with an interface designed as a contact plate is installed, contacting with the corresponding interface arranged on the balance base body wall is automatically effected by the two contact plates lying against each other, i.e., by their mutually facing, plate-shaped surfaces touching. The design of interfaces as contact plates is particularly, but not exclusively, suitable for the formation of a thermal interface between the top unit and the balance electronics.

In a preferred further development, it is provided that the interface formed as a contact plate on the balance base body wall and the interface formed as a contact plate on the top unit are spring-loaded against each other when a connection is formed. The spring bias of the two contact plates against each other ensures that contact is made between the two contact plates when the top unit is installed. The contact area of the two contact plates is maximized.

In addition, at least one interface on the balance base body wall can be designed as an information transmitting and/or receiving interface. Thus, the balance electronics can send and/or receive information via the interface on the balance base body wall. For example, if the top unit has an identification unit, information about the identity of the top unit can be transmitted from the top unit to the balance electronics via the interface on the balance base body wall that is designed as an information receiving interface. If, for example, the top unit has a motorized interior draft shield, the command to open or close the interior draft shield can be transmitted from the balance electronics to the top unit via the interface on the balance base body wall that is designed as an information transmitting interface. This embodiment is also interesting, for example, in the event that the top unit is designed as a pipette calibration module that has a motor-driven shutter and a motion or proximity sensor whose detection area covers the area around the shutter. The information registered by the sensor about the approach or removal of an object, e.g. a pipette tip, to or from the area around the closure can be transmitted from the top unit to the balance electronics via the interface on the balance base body wall, which is designed as an information receiving interface. The balance electronics can then transmit a command to open or close the pipette calibration module closure to the top unit via the interface on the base body wall of the balance, which is designed as an information transmission interface.

Further preferably, at least one interface on the balance base body wall is designed as an energy supply interface. This is necessary if the top unit is designed in such a way that it requires energy for its intended function. The top unit can then obtain the required energy from the energy supply system of the balance base body via the energy supply interface on the balance base body wall, which the top unit contacts to form an energy-conducting connection.

Conveniently, the top unit is reversibly fixed to the balance base body wall with a detachable snap-in connection. The use of a detachable snap-in connection for fastening the top unit to the balance base body wall makes the top unit easy to install and remove. When the top unit is snapped to the balance base body wall, the top unit is reliably held to the balance base body wall and thus to the balance base body. The design of the snap-in connection as detachable also enables simple, tool-free removal of the top unit from the balance base body.

In addition to the gravimetric measuring device, the balance base body without top unit and the top units themselves also represent interesting mercantile units.

Such a top unit can serve to extend a gravimetric measuring device by a new function. A top unit according to the invention for a gravimetric measuring device according to the invention comprises a fastener for reversible fixing to a balance base body wall and is characterized in particular by at least one optical, magnetic, tactile, radio-technical, thermal, electrical and/or electronic interface. Through this interface, the top unit can be connected to a corresponding interface on the balance base body wall of a balance base body for forming an optical, magnetic, tactile, radio-technical, thermal, electrical and/or electronic connection between the top unit and the balance electronics.

A balance base body for a measuring device according to the invention in turn comprises a balance base body wall as well as a weighing system with a load receptor penetrating the balance base body wall and is characterized in particular by the fact that a plurality of optical, magnetic, tactile, radio-technical, thermal, electrical and/or electronic interfaces coupled with balance electronics are arranged on the balance base body wall.

Further details and advantages of the invention will be apparent from the following specific description and drawings.

DETAILED DESCRIPTION

Identical reference signs in the figures indicate identical or analogous elements.

Figure 1:
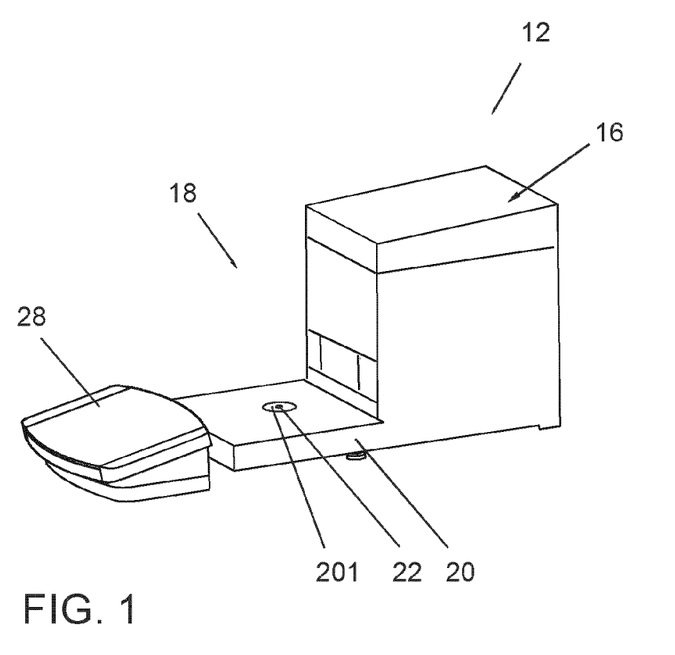
FIG. 1: a schematic representation of a basic balance body according to the invention.

FIG. 1 shows a schematic representation of a gravimetric measuring device according to the invention without a top unit, i.e., a basic balance body 12 according to the invention. The basic balance body 12 essentially comprises a weighing system compartment 16 in which the weighing system is arranged, a weighing chamber 18 and a balance electronics in the form of an electronic unit 28. In the embodiment shown, the electronic unit 28 comprises a large-format display and an input device. It may additionally include a control device. It is true that this can also be arranged at another location on the balance base body 12. However, it is considered advantageous if the control unit is thermally isolated from the weighing chamber 18 as well as from the weighing system compartment 16. The specific structure of the weighing system is not important in the context of the present invention. However, in any case, it comprises a load receptor 22 which penetrates the balance base body wall 20. In the embodiment shown, the load receptor 22 penetrates the balance base body wall 20 in the region that forms the weighing chamber floor of the weighing chamber 18 adjacent to the weighing system compartment 16. In addition, a plurality of optical, magnetic, tactile, radio, thermal, electrical, and/or electronic interfaces 201 are disposed in the region of the balance base body wall 20 that forms the weighing chamber floor and are coupled to the electronic unit 28. These interfaces 201 could instead be arranged in another region of the balance base body wall 20. In particular, but not exclusively, the area of the balance base body wall 20 that forms the rear wall of the weighing chamber is an interesting alternative for the arrangement of the interfaces 201.

Figure 2:
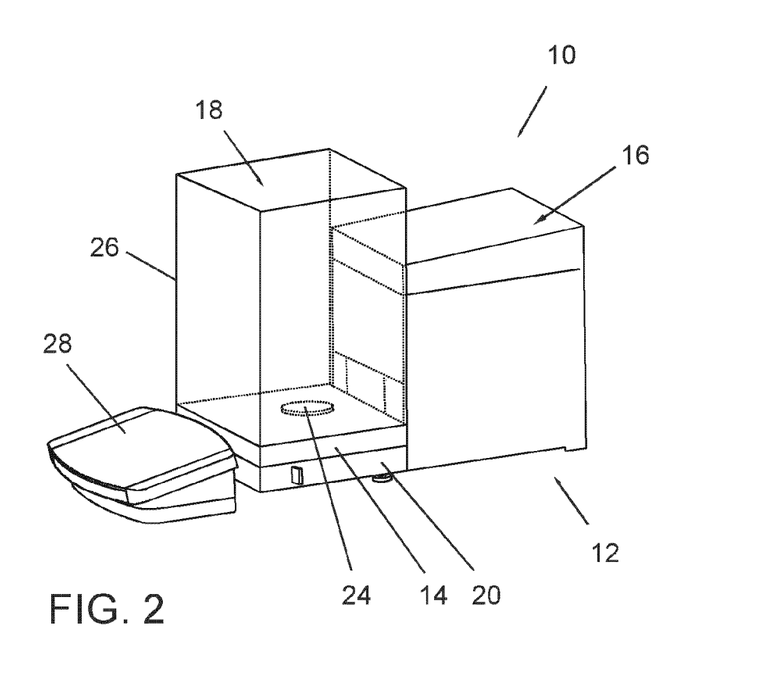
FIG. 2: a schematic representation of a gravimetric measuring device according to the invention, comprising the balance base body of FIG. 1 as well as a first top unit and a draft shield.

FIG. 2 shows a schematic representation of a gravimetric measuring device 10 according to the invention, comprising the basic balance body 12 from FIG. 1 and a first top unit 14. In the embodiment shown, the weighing chamber 18 is shielded from the surroundings by a weighing chamber wall. The weighing chamber wall is composed of a motorized draft shield 26, which forms a weighing chamber cover, weighing chamber side walls, a front wall and a rear wall, as well as the top unit 14. A sample carrier 24, on which the sample is positioned for weighing, is arranged at the free end of the load receptor 22, which penetrates both the balance base body wall 20 in the area that forms the weighing chamber base and the top unit 14. The top unit 14 is reversibly fixable to the balance base body wall 20, more precisely to the weighing chamber base. In addition to a mechanical interface for fixing to the balance base body 12, the top unit 14 has at least one optical, magnetic, tactile, radio, thermal, electrical and/or electronic interface (both not shown) that contacts one of the interfaces 201 on the balance base body wall 20 to form a connection. This may be, for example, an electrical or electronic interface configured as a power supply interface that is used to supply power to the motorized draft shield 26 and/or a lighting device disposed on the top unit 14.

Figure 3:
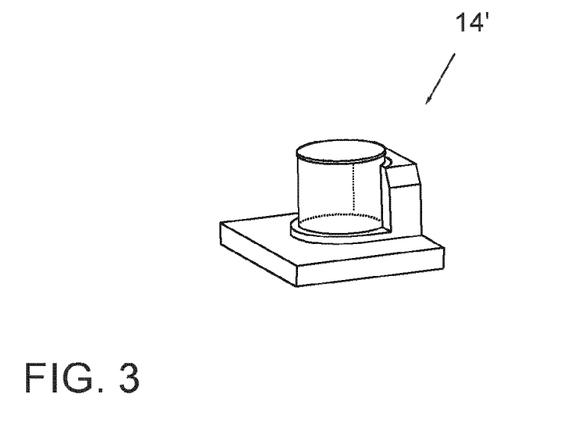
FIG. 3: a schematic representation of a second top unit designed as an automatic internal windbreak.

FIG. 3 shows a schematic representation of a second top unit 14' designed as an automatic internal draft shield. The top unit 14' has a fastener for reversible fixing to a balance base body wall 20, in particular to a weighing chamber floor, of a balance base body 12 according to the invention, as well as at least one interface (both not drawn) which, when the top unit 14' is installed on a balance base body 12, corresponds with a corresponding interface 201 on its balance base body wall 20. In particular, the top unit 14' may include a motor for driving the automatic interior draft shield, a motion sensor for detecting an approach or removal from the sensing space of the sensor, an electrical or electronic interface configured as a power supply interface, and an electrical or electronic interface configured as an information sending and receiving interface.

Figure 4:
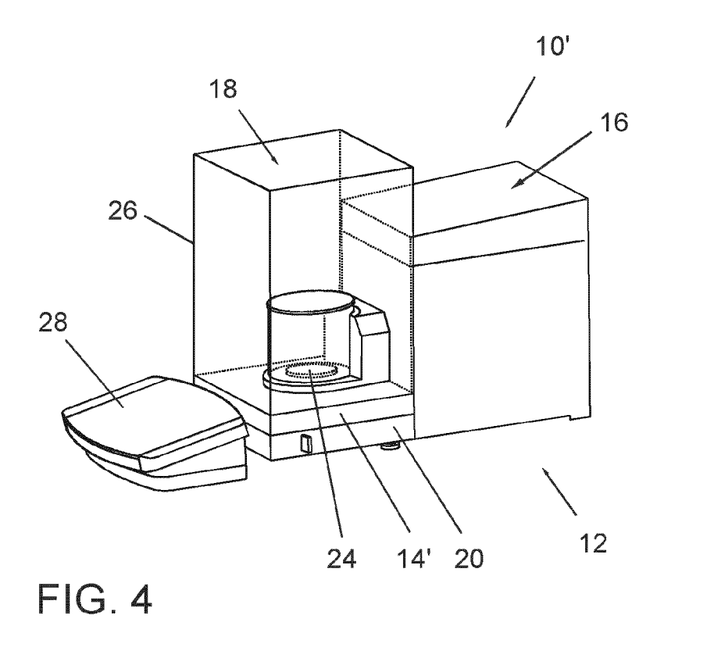
FIG. 4: a schematic representation of a gravimetric measuring device according to the invention, comprising the basic balance body of FIG. 1 as well as the top unit of FIG. 3 and a draft shield.

FIG. 4 shows a schematic representation of a gravimetric measuring device 10' according to the invention, comprising the balance base 12 from FIG. 1 and the top unit 14' from FIG. 3 and a draft shield 26. The at least one interface on the top unit 14' is connected to a corresponding interface 201 on the weighing chamber base 20, forming a contact. As a result, the information registered by the motion sensor about the approach or removal of an object to or from the detection space of the sensor can be transmitted from the top unit 14' to the weighing electronics via the interface designed as an information receiving interface, which is arranged on the base body wall of the balance. Thereupon, a command to open or close the automatic interior draft shield can be transmitted from the balance electronics to the top unit via the interface designed as an information transmission interface, which is arranged on the balance base body wall, whereby the automatic interior draft shield 14' can draw energy from the energy supply system of the balance base body 12 via the energy supply interface on the balance base body wall 20, via which, for example, the motor of the top unit 14' is supplied with energy. Thus, the automatic interior draft shield 14' can be motorized to open when an object approaches or to close again when the object is removed, the control being provided by the electronic unit 28.

Figure 5:
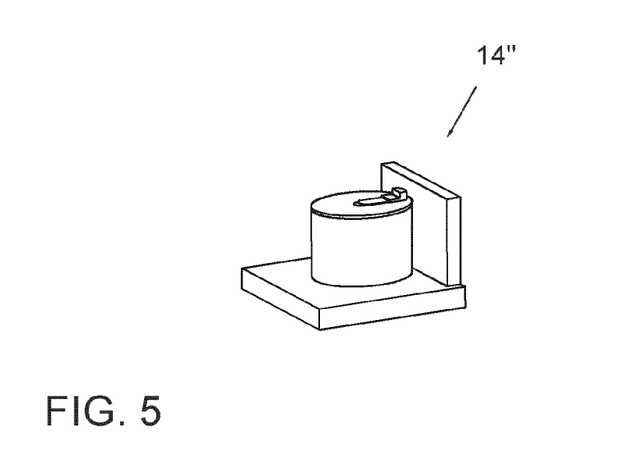
FIG. 5: a schematic representation of a third top unit designed as an automatic pipette calibration module.

FIG. 5 shows a schematic representation of a third top unit 14" designed as an automatic pipette calibration module. This top unit 14" also has a fastener for reversible fixing to a balance base body wall 20 of a balance base body 12 according to the invention, as well as at least one interface (both not drawn) which, when the top unit 14" is installed on a balance base body 12, corresponds with a corresponding interface 201 on its balance base body wall 20. This top unit 14" may in particular have a thermal interface.

Figure 6:
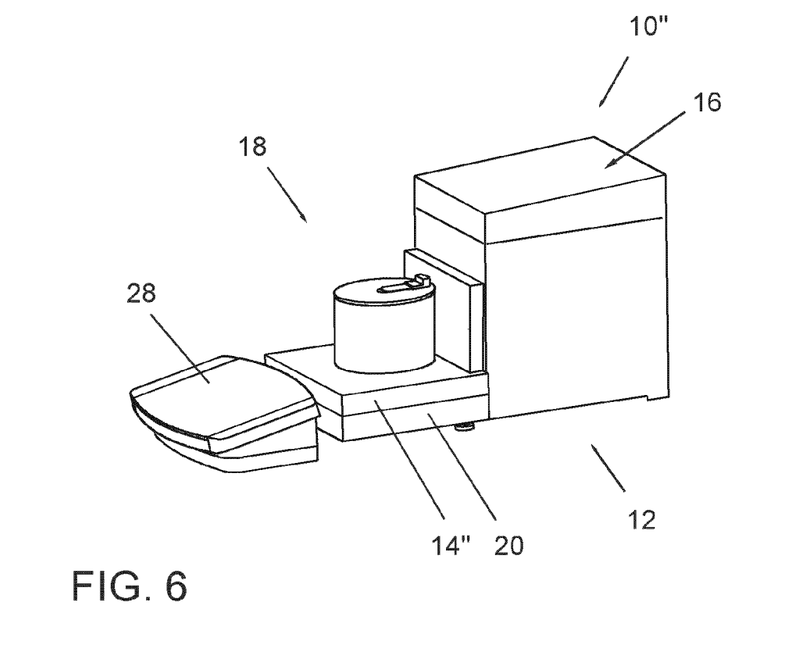
FIG. 6: a schematic representation of a gravimetric measuring device according to the invention, comprising the balance base body from FIG. 1 and the top unit from FIG. 5.

FIG. 6 shows a schematic representation of a gravimetric measuring device 10" according to the invention, comprising the balance base body 12 from FIG. 1 and the top unit 14" from FIG. 5. The at least one interface on the top unit 14" is connected to a corresponding interface 201 on the balance base body wall 20, forming a contact. Thus, the pipette calibration module 14" can be controlled by the electronic unit 28 via the thermal interface 201 on the balance base body wall 20 and the temperature of the pipette calibration module 14" can be kept constant and cooled or heated as required.

Figure 7:
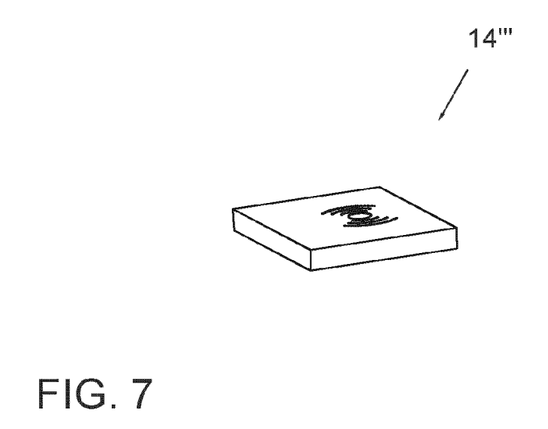
FIG. 7: a schematic representation of a fourth top unit designed as an RFID reader.

FIG. 7 shows a schematic representation of a fourth top unit 14''' designed as an RFID reader. For reversible fixing to a balance base body wall 20 of a balance base body 12 according to the invention, this top unit 14''' also has an affixation mechanism (not shown). Furthermore, the top unit 14''' has at least one interface (also not shown) which, when the top unit 14''' is installed on a balance base body 12, corresponds to a corresponding interface 201 on its balance base body wall 20. In particular, the top unit 14''' can have a radio interface designed as an information transmission interface.

Figure 8:
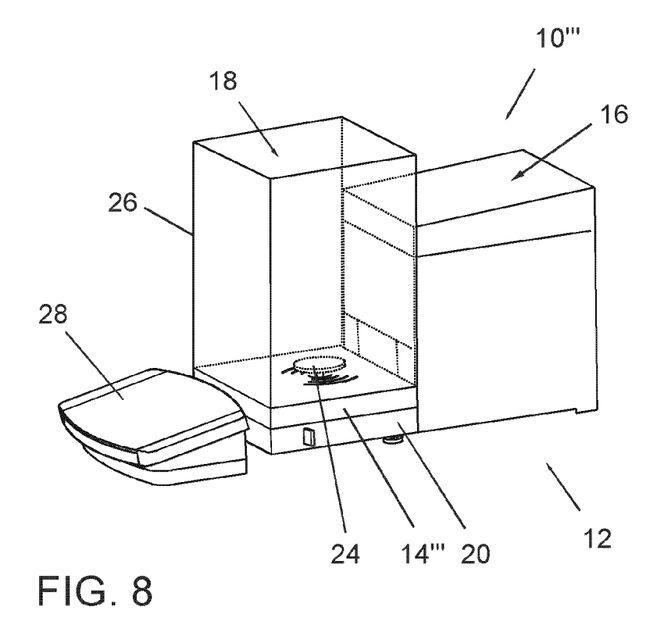
FIG. 8: a schematic representation of a gravimetric measuring device according to the invention, comprising the basic balance body of FIG. 1 as well as the top unit of FIG. 7 and a draft shield.

FIG. 8 shows a schematic representation of a gravimetric measuring device 10''' according to the invention, comprising the basic balance body 12 from FIG. 1 and the top unit 14''' from FIG. 7 and a draft shield 26. The at least one interface on the top unit 14''' is connected to a corresponding radio interface 201 on the wall of the basic balance body 20, which is designed as an information receiving interface, forming a contact. In this way, for example, information about the identity of the top unit 14''', information about the material to be weighed, for example a batch number, or the like can be transmitted from the top unit to the electronic unit 28.

The embodiments discussed in the specific description and shown in the figures are only illustrative examples of embodiments of the present invention. The person skilled in the art is provided with a wide range of possible variations in light of the present disclosure.

LIST OF REFERENCE SIGNS 10, 10', 10", 10''' gravimetric measuring device
12 balance base body
14, 14', 14", 14''' top unit
16 weighing system compartment
18 weighing chamber
20 balance base body wall
201 interfaces
22 load receptor
24 sample carrier
26 draft shield
28 electronic unit

What is claimed is:
1. Gravimetric measuring device system, comprising:
a balance base body having a balance base body wall and a plurality of interfaces coupled to a balance electronics,
a weighing system comprising a load receptor configured to pass through the balance base body wall, and
a plurality of different top units,
configured to provide alternative and mutually differing gravimetric measuring devices,
each of which alternative and mutually differing gravimetric measuring devices comprising the balance base body, the weighing system and at least a selected one of the different top units,
wherein, for each of the alternative and mutually differing measuring devices, the accordingly selected one top unit is reversibly fixed on the balance base body wall of the balance base body,
and the weighing system load receptor is further configured to pass to the accordingly selected one top unit,
and wherein, for each of the alternative and mutually differing gravimetric measuring devices, a plurality of optical, magnetic, tactile, radio, thermal, electrical and/or electronic interfaces coupled to the balance electronics are arranged on the balance base body wall, at least one of which interfaces is connected to a corresponding interface of the accordingly selected one top unit to form an optical, magnetic, tactile, radio, thermal, electrical or electronic connection between the accordingly selected one top unit and the balance electronics, while others of the plurality of interfaces are not connected to corresponding interfaces of the accordingly selected one top unit.

2. Gravimetric measuring device system according to claim 1, wherein at least one of the interfaces on the balance base body wall is a plug or a socket and the corresponding interface of the accordingly selected one top unit is correspondingly a socket or a plug configured to mate with the at least one interface on the balance body.

3. Gravimetric measuring device system according to claim 1, wherein
at least one of the interfaces on the balance base body wall as well as the corresponding interface of the accordingly selected one top unit are formed as contact plates which lie with respective surfaces thereof against each other when a connection is formed.

4. Gravimetric measuring device system according to claim 3, wherein
the interface formed as a contact plate on the balance base body wall and the interface formed as a contact plate on the accordingly selected one top unit are spring-loaded against each other when a connection is formed therebetween.

5. Gravimetric measuring device system according to claim 1, wherein
at least one of the interfaces on the balance base body wall is configured as an information transmitting and/or information receiving interface.

6. Gravimetric measuring device system according to claim 1, wherein
at least one of the interfaces on the balance base body wall is configured as a power supply interface.

7. Gravimetric measuring device system according to claim 1, wherein
for each of the alternative and mutually differing measuring devices, the accordingly selected one top unit is reversibly fixed to the balance base body wall with a detachable snap-in connection.

8. System, comprising:
a single balance base body comprising
a weighing system with a sensor system and a load receptor and
balance electronics and a plurality of base body interfaces, and
a plurality of accessory units each configured to connect detachably to and interchangeably with the single base body,
wherein each of the accessory units comprises a respective accessory unit interface and is configured to provide a respectively unique gravimetric function, and
wherein the base body interfaces are configured to connect to the accessory unit interfaces and thereby to establish at least two optical, magnetic, tactile, mechanical, radio, thermal, electrical or electronic connections between the base body interfaces and selected ones of the accessory unit interfaces.

* * * * *